(12) United States Patent
Müller et al.

(10) Patent No.: US 12,374,102 B2
(45) Date of Patent: Jul. 29, 2025

(54) NEURAL NETWORK CONTROL VARIATES

(71) Applicant: NVIDIA Corporation, Santa Clara, CA (US)

(72) Inventors: Thomas Müller, Rheinfelden (DE); Fabrice Pierre Armand Rousselle, Ostermundigen (CH); Alexander Georg Keller, Berlin (DE); Jan Novák, Zürich (CH)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/478,025

(22) Filed: Sep. 29, 2023

(65) Prior Publication Data
US 2024/0020443 A1    Jan. 18, 2024

Related U.S. Application Data

(63) Continuation of application No. 17/083,787, filed on Oct. 29, 2020, now Pat. No. 11,816,404.
(Continued)

(51) Int. Cl.
*G06V 20/10* (2022.01)
*G06F 17/11* (2006.01)
(Continued)

(52) U.S. Cl.
CPC .............. *G06V 20/10* (2022.01); *G06F 17/11* (2013.01); *G06F 30/27* (2020.01); *G06N 3/045* (2023.01);
(Continued)

(58) Field of Classification Search
CPC ................................ G06V 20/10; G06F 30/27
(Continued)

(56) References Cited

U.S. PATENT DOCUMENTS 11,132,771 B2 *  9/2021  Gordon ................. H04N 23/81
11,170,254 B2    11/2021  Wrenninge et al.
(Continued)

OTHER PUBLICATIONS

Muller_2019 (Neural Importance Sampling, Sep. 3, 2019) (Year: 2019).*
(Continued)

*Primary Examiner* — Brian S Cook
(74) *Attorney, Agent, or Firm* — Leydig, Voit & Mayer, Ltd.

(57) ABSTRACT

Monte Carlo and quasi-Monte Carlo integration are simple numerical recipes for solving complicated integration problems, such as valuating financial derivatives or synthesizing photorealistic images by light transport simulation. A drawback of a straightforward application of (quasi-)Monte Carlo integration is the relatively slow convergence rate that manifests as high error of Monte Carlo estimators. Neural control variates may be used to reduce error in parametric (quasi-)Monte Carlo integration—providing more accurate solutions in less time. A neural network system has sufficient approximation power for estimating integrals and is efficient to evaluate. The efficiency results from the use of a first neural network that infers the integral of the control variate and using normalizing flows to model a shape of the control variate.

20 Claims, 12 Drawing Sheets

Related U.S. Application Data

(60) Provisional application No. 62/992,717, filed on Mar. 20, 2020.

(51) Int. Cl.
    G06F 30/27    (2020.01)
    G06N 3/045    (2023.01)
    G06T 15/06    (2011.01)
    G06T 15/50    (2011.01)
    G06V 10/44    (2022.01)
    G06V 10/60    (2022.01)
    G06V 10/82    (2022.01)
    G06F 111/10    (2020.01)

(52) U.S. Cl.
CPC ............ *G06T 15/06* (2013.01); *G06T 15/506* (2013.01); *G06V 10/44* (2022.01); *G06V 10/60* (2022.01); *G06V 10/82* (2022.01); *G06F 2111/10* (2020.01)

(58) Field of Classification Search
USPC .......................................................... 703/2
See application file for complete search history.

(56) References Cited

U.S. PATENT DOCUMENTS

| | | | |
|---|---|---|---|
| 2016/0321523 | A1 | 11/2016 | Sen et al. |
| 2019/0244060 | A1 | 8/2019 | Dundar et al. |
| 2019/0251397 | A1 | 8/2019 | Tremblay et al. |
| 2019/0304069 | A1* | 10/2019 | Vogels .................... G06N 20/00 |

OTHER PUBLICATIONS

Krykova_2003 (Evaluating of Path-Dependent Securities with Low Discrepancy Methods, Dec. 2003). (Year: 2003).*
Abrahams_2016 (Tensorflow for machine intelligence, bleeding edge press, 2016). (Year: 2016).*
3D_Light_Transport_2016 (Global Illumination and Path Tracing: a Practical Implementation, 2016). (Year: 2016).*
Roussele_2016 (Image-Space Control Variates for Rendering, SA' 16 Technical Papers,. Dec. 5-8, 2016). (Year: 2016).*
Asaraf, R., et al., "Zero-Variance Principle for Monte Carlo Algorithms," Phys. Rev.Lett. 83 (Dec. 1999), 4682-4685, Issue 23.
Bitterli, B., "Rendering resources," https://benedikt-bitterli.me/resources/.
Dahm, K., et al., "Learning Light Transport the Reinforced Way," In Monte Carlo and Quasi-Monte Carlo Methods, Art B. Owen and Peter W. Glynn (Eds.), Springer International Publishing, 181-195.
Georgiev, I., et al., "Integral Formulations of volumetric transmittance," ACM Transactions on Graphics (Proceedings of SIGGRAPH Asia) 38, 6 (Nov. 2019.).
Germain M., et al., "MADE: Masked Autoencoder for Distribution Estimation," In International Conference on Machine Learning, 881-889.
Grathwohl, W., et al., "Back-propagation through the Void: Optimizing control variates for black-box gradient estimation," International Conference on Learning Representations.
Hesterberg, T., et al., "Control Variates for Probability and Quantile Estimation," Management Science 44, 9 (Sep. 1998), 1295-1312 (Abstract).
Mira, A., et al., "Zero variance Markov chain Monte Carlo for Bayesian estimators," Statistics and Computing 23 (2013), 653-662.
Muller, T., et al., "Neural Importance Sampling," ACM Trans. Graph. 38, 5, Article 145 (Oct. 2019), 19 pages.
Oates, C., et al., "Control functionals for Monte Carlo integration," Journal of the Royal Statistical Society Series B—statistical Methodology 79 (2014), 695-718.
Owen A., et al., "Safe and Effective Importance Sampling," J.Amer. Statist.Assoc. 95, 449 (2000), 135-143.
Papamakarios, G., et al., "Normalizing Flows for Probabilistic Modeling and Inference," arXiv:stat.ML/1912.02762.
Stein, C., et al., "A bound for the error in the normal approximation to the distribution of a sum of dependent random variables," In Proceedings of the Sixth Berkeley Symposium on Mathematical Statistics and Probability, vol. 2: Probability Theory. University of California Press, Berkeley, Calif., 583-602.
Tabak, E., et al., "Density Estimation by dual Ascent of the Log-Likelihood," Communications in Mathematical Sciences 8, 1 (2010), 217-233.
Tewari, A., et al., "State of the Art on Neural Rendering," arXiv:cs.CV/2004.03805.
Vidales, M., et al., "Unbiased deep solvers for parametric PDEs," arXiv:1810.05094 (Oct. 2018).
Wan, R., et al., "Neural Control Variates for Variance Reduction," arXiv:1806.00159 (Oct. 2019).
Krykova, I., "Evaluating of Path-Dependent Securities with Low Discrepancy Methods," Dec. 2003.
Muller, T., et al., "Neural Importance Sampling," Sep. 3, 2019.
Muller , T., et al., "Monte Carlo Integration with Normalizing Flows," Jun. 2019.
Onlyconnect, The Pros and Cons of NVIDIA's Cloud GPU, May 16, 2012.
Abadi, M. et al., "TensorFlow: Large-Scale Machine Learning on Heterogeneous Systems," at http://tensorflow.org/.
Bekaert, P., et al., "A custom designed Density Estimation Method for Light Transport," MPI-I-2003-4-004 (Apr. 2003).
Belcour, L., et al., "5D Covariance Tracing for Efficient Defocus and Motion Blur," ACM Trans. Graph. 32, 3, Article 31 (Jul. 2013) 18 pp.
Broadie, M., et al., "Risk Management and Analysis," vol. 1: Measuring and Modelling Financial Risk, Wiley, New York, Chapter Simulation for option pricing and risk management, 173-208.
Chen, T., et al., "Neural Ordinary Differential Equations," arXiv:1806.07366 (Jun. 2018).
Clarberg, P., et al., "Exploiting Visibility Correlation in Direct Illumination," Computer Graphics Forum 27, 4 (2008), 1125-1136.
Dinh, L., et al., "Density Estimation using real NVP," arXiv:1605.08803 (Mar. 2016).
Dinh, L., et al., "Non-Linear Independent Components Estimation," arXiv:1410.8516 (Oct. 2014).
Fan, S et al., "Optimizing Control Variate Estimators for Rendering," Computer Graphics Forum 25, 3 (2006), pp. 351-358.
Giles, M., "Chapter Improved Multilevel Monte Carlo Convergence using the Milstein Scheme," 2008, Monte Carlo and Quasi Monte Carlo Methods 2006, pp. 343-358.
Giles, M., "Multilevel Monte Carlo Methods," in Monte Carlo and Quasi-Monte Carlo Methods 2012, Springer, Berlin, Heidelberg, 83-103.
Glorot, X., et al., "Understanding the Difficulty of Training Deep Feedforward Neural Networks," In Proc. 13th International Conference on Artificial Intelligence and Statistics (May 13-15), JMLR.org., 249-256.
He, K., et al., "Deep Residual Learning for Image Recognition," In IEEE Conference on Computer Vision and Pattern Recognition (CVPR).
Heinrich, S., "Monte Carlo Complexity of Global Solution of Integral Equations," Journal of Complexity 14, 2 (1998), pp. 151-175.
Herholz, S., et al., "Volume Path Guiding Based on Zero-Variance Random Walk Theory," ACM Trans. Graph. 38, 3, Article 25 (Jun. 2019), 19 pages.
Hermosilla, P., et al., "Deep-learning the Latent Space of Light Transport," Computer Graphics Forum 38, 4 (2019).
Hornik, K., et al., "Multilayer Feedforward Networks Are Universal Approximators," Neural Netw. 2, 5 (Jul. 1989), 359-366.
Huang, C., et al., "Neural Autoaggressive Flows," arXiv:1804.00779 (Apr. 2018).
Ioffe, S., et al., "Batch Normalization: Accelerating Deep Network Training by Reducing Internal Covariate Shift," arXiv:1502.03167 (2015).

(56) References Cited

OTHER PUBLICATIONS

Kallweit, S., et al., "Deep Scattering: Rendering Atmospheric Clouds with Radiance-Predicting Neural Networks," ACM Trans. Graph. 36, 6, Article 231 (Nov. 2017).
Kingma, D., et al., "Adam: A Method for Stochastic Optimization," arXiv:1412.6980 (Jun. 2014).
Kingma, D., et al., "Glow: Generative Flow with Invertible 1×1 Convolutions," arXiv:1807.03039 (Jul. 2018).
Kingma, D., et al., "Improved Variational Inference with inverse Autoregressive Flow," In Advances in Neural Information Processing Systems, 4743-4751.
Kondapaneni, I., et al., "Optimal Multiple Importance Sampling," ACM Trans. Graph. 38, 4, Article 37 (Jul. 2019), 14 pages.
Lafortune, E., et al., "The Ambient Term as a Variance Reducing Technique for Monte Carlo Ray Tracing," In Proc. EGWR, 163-171.
Lafortune, E., et al., "A 5D Tree to Reduce the Variance of Monte Carlo Ray Tracing," In Proc. EGWR, 11-20.
Lavenberg, S., et al., "Statistical Results on Control Variables with Application in Queueing Network Simluation," Operations Research 30, 1 (1982), 182-202.
Lehtinen, J., et al., "Noise2Noise: Learning Image Restoration with Clean Data," arXiv:cs.CV/1083.04189.
Lombardi, S., et al., "Neural Volumes: Learning Dynamic Renderable Volumes from Images," ACM Trans. Graph. 38, 4, Article 65 (Jul. 2019), 14 pages.
Maximov, M., et al., "Deep Appearance Maps," In the IEEE International Conference on Computer Vision (ICCV).
Meka, A., et al., "Deep Reflectance Fields: High-Quality Facial Reflectance Field Inference from Color Gradient Illumination," ACM Trans. Graph. 38, 4, Article 77 (Jul. 2019), 12 pages.
Muller, T et al., "Practical Path Guiding for Efficient Light-Transport Simulation," Computer Graphics Forum 36, 4 (Jun. 2017), 91-100.
Nalbach, O., et al., "Deep Shading: Convolutional Neural Networks for Screen-Space Shading," 36, 4 (2017).
Nelson, B., "Control Variate Remedies," Operations Research 38, 6 (1990), 974-992.
Novak, J., et al., "Residual Ratio Tracking for Estimating Attenuation in Participating Media," ACM Trans. Graph. 33, 6 (Nov. 2014).
Papamakarios, G., et al., "Masked Autoregressive Flow for Density Estimation," In Advances in Neural Information Processing Systems, 2338-2347.
Pegoraro, V., et al., "Towards Interactive Global Illumination Effects via Sequential Monte Carlo Adaptation," In Proceedings of the 3rd IEEE Symposium on Interactive Ray Tracing, 107-114.
Pegoraro, V., et al., "Sequential Monte Carlo Adaptation in Low-Anisotrophy Participating Media," Computer Graphics Forum (Proceedings of the 19$^{th}$ Eurographics Symposium on Rendering) 27, 4, 2008, 1097-1104.
Pharr, M., et al., "Physically Based Rendering From Theory to Implementation," Morgan Kaufmann, Third Edition.
Rezende, D., et al., "Variational Inference with Normalizing Flows," In International Conference on Machine Learning, pp. 1530-1538.
Rousselle, F., et al., "Image-space Control Variates for Rendering," ACM Trans. Graph. 35, 6, Article 169 (Nov. 2016), 12 pages.
Sitzmann, V., et al., "DeepVoxels: Learning Persistent 3D Feature Embeddings," in CVPR.
Szirmay-Kalos, L., et al., "Free Path Sampling in High Resolution Inhomogeneous Participating Media," Computer Graphics Forum 30, 1 (2011), 85-97.
Tabak, E., et al., "A Family of Nonparametric Density Estimation Algorithms," Communications on Pure and Applied Mathematics 66, 2 (2013), pp. 145-164.
Thies, J., et al., "Deferred Neural Rendering: Image Synthesis Using Neural Textures," ACM Trans. Graph. 38, 4, Article 66 (Jul. 2019), 12 pages.
Veach, E., et al., "Optimally Combining Sampling Techniques for Monte Carlo Rendering," In Proc. SIGGRAPH, 419-428.
Vicini, D., et al., "A Learned Shape-Adaptive Subsurface Scattering Model," ACM Trans. Graph. 38, 4, Article 127 (Jul. 2019), 15 pages.
Vorba, J. et al., "On-Line Learning of Parametric Mixture Models for Light Transport Simulation," ACM Trans. Graph. 33, 4 (Aug. 2014).
Vorba, J. et al., "Adjoint-Driven Russian Roulette and Splitting in Light Transport Simulation," ACM Trans. Graph. 35, 4 (Jul. 2016).
Zheng, Q., et al., "Learning to Importance Sample in Primary Sample Space," Computer Graphics Forum 38, 2 (2019), 169-179.
Barth, A., et al., "Multi-level Monte Carlo Finite Element method for Elliptic PDEs with Stochastic Coefficients," Numer.Math. 119, 1(2011), 123-161, at https://doi.org/10.1007/s00211-011-0377-0.
Glynn, P., et al., "Monte Carlo and Quasi-Monte Carlo Methods 2000," Chapter Some New Perspectives on the Method of Control Variates, 27-49.
Keller, A, "Hierarchical Monte Carlo Image Synthesis," Mathematics and Computers in Simulation 55, 1-2(2001), 79-92.
Kemna, A.G.Z., et al., "A Pricing Method for Options based on Average Asset Values," Journal of Banking & Finance 14, 1 (1990), pp. 113-129.
Ren, P., et al., "Global Illumination with Radiance Regression Functions," ACM Trans. Graph. 32, 4, Article 130 (Jul. 2013), 12. Pp.
Szecsi, L., et al., "Combined Correlated and Importance Sampling in Direct Light Source Computation and Environment Mapping," Computer Graphics Forum 23 (2004) 585-594.
Vorba, J., et al., Path Tracing in Production, in ACM SIGGRAPH Courses, ACM, New York, NY 18:1-18:77.
U.S. Appl. No. 17/083,787, filed Oct. 29, 2020.

* cited by examiner

NEURAL NETWORK CONTROL VARIATES

CLAIM OF PRIORITY

This application is a continuation of U.S. patent application Ser. No. 17/083,787 titled "Neural Network Control Variates," filed Oct. 29, 2020, which claims the benefit of U.S. Provisional Application No. 62/992,717 titled "Neural Control Variates Using Normalizing Flows," filed Mar. 20, 2020. The entire contents of both applications are incorporated herein by reference.

BACKGROUND

Monte Carlo and quasi-Monte Carlo integration is a simple numerical recipe for solving complicated integration problems. Examples of complicated integration problems include valuating financial derivatives or synthesizing photorealistic images by light transport simulation. (Quasi-) Monte Carlo is particularly attractive when there are no analytic solutions to the integration problem and classic numerical algorithms (e.g. finite elements) fail due to the curse of dimensionality or a lack of smoothness in the integrand.

The main drawback of a straightforward application of Monte Carlo integration is the relatively slow convergence rate that manifests as high variance of Monte Carlo estimators and high error of quasi-Monte Carlo estimators. Hence, approaches have been developed to improve efficiency of the computation. Among the most frequently used approaches are techniques focused on carefully placing samples, e.g., antithetic sampling, stratification, quasi-random sampling, or importance sampling. A complimentary way to further reduce variance is to leverage hierarchical integration or the concept of control variates.

Reducing variance by control variates amounts to leveraging an approximate solution of the integral corrected by an estimate of the approximation error. The numerical efficiency of estimating the integral, depends on a scaled control variate. Because a poorly chosen control variate may decrease efficiency, early research focused on an efficient and accurate estimation of the scaling coefficient $\alpha$. While the optimal, variance-minimizing value of a is known, estimating a numerically may introduce bias if done using samples correlated to the samples used for the actual estimate. The core challenge of applying the method of control variates has been finding a good approximation of the integrand that is efficient, in terms of computations and/or time, to integrate. There is a need for addressing these issues and/or other issues associated with the prior art.

SUMMARY

The application of control variates has been explored in many fields, predominantly in the field of financial mathematics and operations research. Control variates may be used to reduce the error of an estimate produced via Monte Carlo or quasi-Monte Carlo integration. In contrast to conventional systems, such as those described above, a neural network generated control variate satisfies two properties: it approximates the integrand well and its integral is efficiently computable.

Embodiments of the present disclosure relate to neural network control variates. Systems and methods are disclosed for parametrizing and learning a control variate that has large approximation power while still having an efficiently computable integral. A first parametric integral $G(y)$ of a first function $g(x,y)$ is predicted based on an input y using a first neural network and a shape of the first function is approximated using a second function $\bar{g}(x,y)$ that integrates to one, where parameters of the second function are computed by at least one neural network. The first function is computed as a product of the first parametric integral and the second function and a difference integral is estimated using the product. The difference integral and the first parametric integral are combined to estimate a solution of a second parametric integral $F(y)$ and a linear operator is approximated using the solution.

BRIEF DESCRIPTION OF THE DRAWINGS

The present systems and methods for neural network control variates are described in detail below with reference to the attached drawing figures, wherein.

DETAILED DESCRIPTION

Systems and methods are disclosed related to neural network control variates. Neural control variates (NCV) are control variates that are predicted by a neural network system and may be used to perform unbiased variance reduction in parametric Monte Carlo integration or error reduction in parametric quasi-Monte Carlo integration when solving integral equations. A neural network system implements a normalizing flow to approximate the shape of the integrand and infers the solution of the integral equation. The neural network system parametrizes and learns a control variate that has large approximation power while still having an efficiently computable integral. An integral predicted by first neural network is combined with a parametrized normalizing flow implemented using one or more second neural networks to parameterize a control variate. Furthermore, in an embodiment, the first and second neural networks are trained using only noisy estimates of the integrand.

An integral may be estimated for the light transport equation that is used to render photorealistic images, particularly for indirect illumination via path tracing (tracing rays through a scene). The control variate that is computed using a neural network system improves the efficiency of path tracing. Conventionally the number of paths that are traced is increased to reduce noise in rendered images. Use of the control variate that is computed by the neural network system achieves less noise with same number of paths or equal noise with fewer paths.

Reducing variance using control variates leverages an approximate solution of the integral that is corrected by an estimate of the approximation error. The principle is given by the following identity:

$$F=\int_{\mathcal{D}} f(x)dx = \alpha \cdot G + \int_{\mathcal{D}} f(x)-\alpha \cdot g(x)dx. \quad \text{Eq. (1)}$$

Instead of integrating the original function $f$ to obtain the solution F, an $\alpha$-scaled approximation G is used. Approximating G corresponds to integrating a (different) function $g$—the control variate—over the same domain $\mathcal{D}$, i.e. $G=\int_{\mathcal{D}} g(x)dx$. The approximation error is corrected by adding an integral of the difference $f(x)-\alpha \cdot g(x)$; making the right-hand side of equation (1) equal to the left-hand side.

Figure 1A:
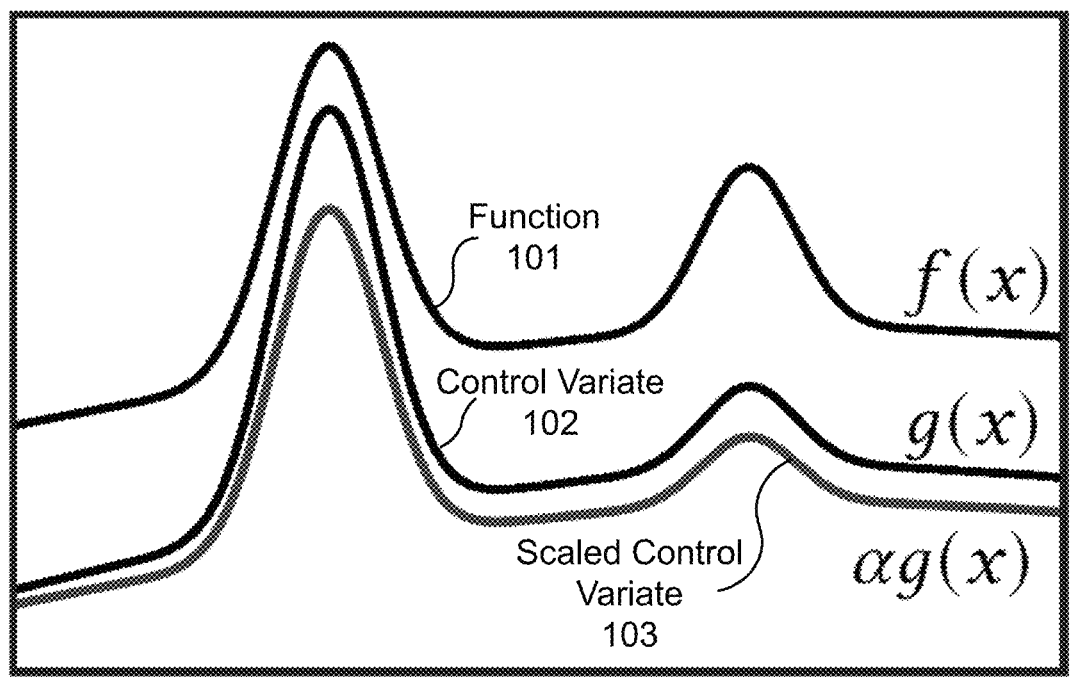
FIG. 1A illustrates using a control variate $g(x)$ to compute an integral F of a function $f(x)$, in accordance with an embodiment.
Figure 1A:
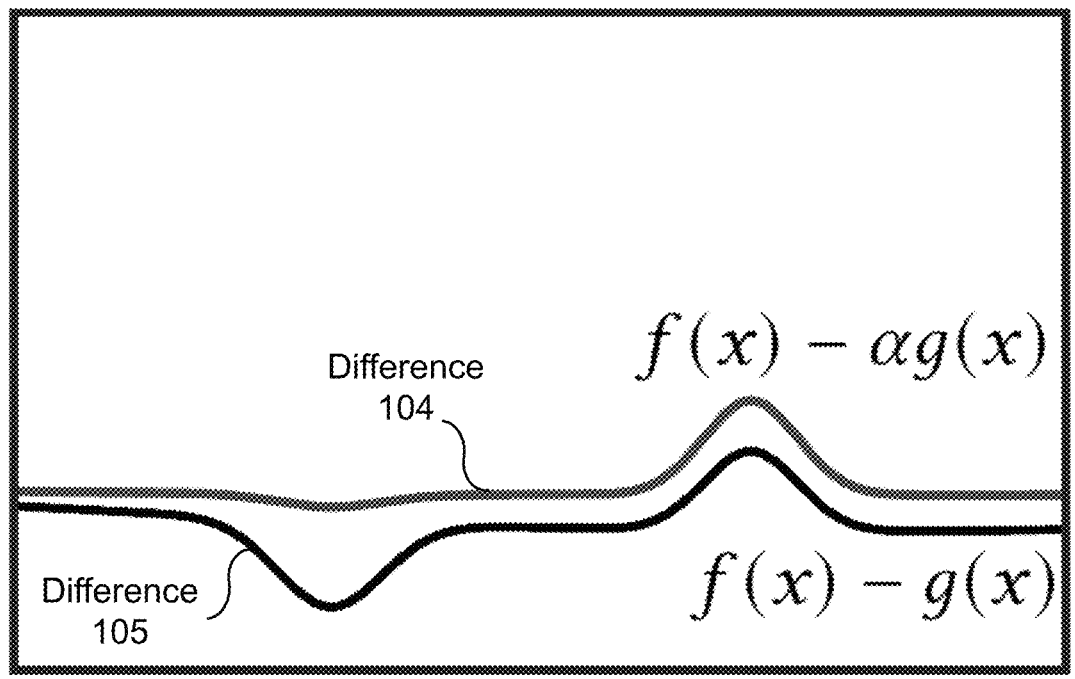

FIG. 1A illustrates using a control variate 102 $g(x)$ to compute an integral F of a function 101 $f(x)$, in accordance with an embodiment. The integral F of the function 101 $f(x)$ is computed with the help of the control variate 102 $g(x)$ by using a known or easy-to-compute integral G and adding an integral of the difference 104. The overall variance may be reduced by minimizing the variance of the difference using an $\alpha$-scaled control variate, where $\alpha=\text{Cov}(f,g)/\text{Var}(g)$.

The numerical efficiency of estimating the right-hand side of Equation (1), relative to estimating the original integral, may depend on the scaled control variate 103 making the integration easier. For example, the difference 104 may expose less variance compared to the difference 105 that does not scale the control variate 102. The difference to integrate is typically smoother as long as the function or integrand $f(x)$ and the control variate $g(x)$ are not correlated. In fact, the scaling coefficient $\alpha$, which controls the strength of applying the control variate 102, should be derived from the correlation of the two functions. In a nutshell, a successful application of control variates necessitates a control variate that approximates the integrand sufficiently well and permits an efficient evaluation and computation of the integral G and scale $\alpha$. In the context of the following description the integrand $f(x)$ and the control variate $g(x)$ may be referred to as $f$ and $g$, respectively.

As described further herein, the control variate $g(x)$ may be inferred from observations of $f(x)$ using machine learning. Normalizing the output of a neural network is generally difficult. Therefore, an output of the neural network is used to parameterize a transformation that can be used to warp a function without changing the integral of the function. Using a transformation allows for functions to be learned that are normalized by construction. Such models are referred to as normalizing flows.

Because the control variate is learned, the key challenge becomes representing the control variate in a form that permits (efficiently) computing its integral, $G=\int_{\mathcal{D}} g(x)dx$.

The difficulty of computing G may be avoided by decomposing the control variate into its normalized form—the shape $\bar{g}(x)$—and the integral G, such that $g(x)=\bar{g}(x) \cdot G$. The shape and the integral can be modeled independently. In an embodiment, the integral G is inferred using a first neural network and the coefficient $\alpha$ is inferred using another neural network.

In an embodiment, to compute the shape $\bar{g}(x,y;\theta_{\bar{g}})$ of the control variate, a tailored variant of normalizing flows is employed. In contrast to standard neural networks, the normalizing flow is capable of representing normalized functions. In an embodiment, parameters $\theta_{\bar{g}}$ of the normalizing flow are inferred using a set of neural networks including at least one neural network. Normalizing flows are a technique for mapping arbitrary distributions to a base distribution; e.g. the normal distribution. The mappings are formally obtained by chaining a series of infinitesimal transformations, hence the name flow.

Figure 1B:
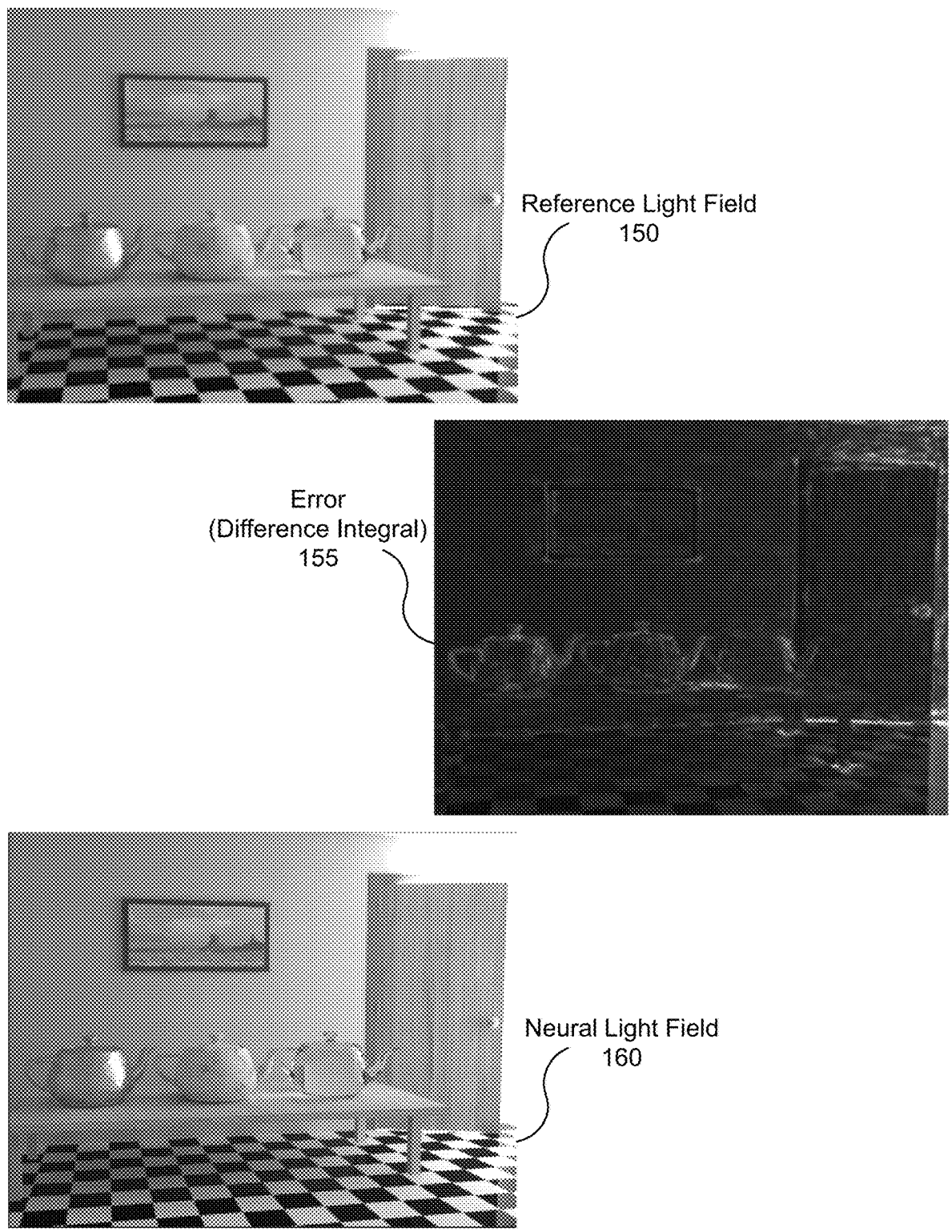
FIG. 1B illustrates images of a reference light field, a light field predicted by the control variate neural network system, and a difference integral, in accordance with an embodiment.

FIG. 1B illustrates images of a reference light field 150, a neural light field 160, and an error (difference integral) 155, in accordance with an embodiment. The control variate neural network system may be used to predict the neural light field 160 and estimate the error 155 using path tracing. Ideally, paths are traced that end at the light source where the door is open because those paths illuminate the scene. Paths that bounce around in the scene without reaching the light source contribute noise to the rendered image. The control variate neural network system may be trained to learn the neural light field 160 so that fewer paths, particularly the important paths, are traced to produce higher quality images. Using the example of light transport, the error 155 is the difference integral and, the error (difference integral) 155 may be summed with G (e.g., predicted neural light field 160) to produce F (e.g., true or reference light field 150). The error (difference integral) 155 is the integral of the difference between the integrand $f(x)$ and the control variate $g(x)$, where $g(x)$ may be scaled by $\alpha$.

To ensure that the predicted light field 160 is accurate, the error (difference integral) 155 should be bounded. The challenge is that the error (difference integral) is not known analytically and is therefore estimated using path tracing. To minimize noise, the control variate in the difference integral approximates the product-term of the rendering equation used to produce the reference light field 150. Learning the control variate and then integrating the control variate to compute the neural light field G, e.g., $G=\int_{\mathcal{D}} g(x)dx$, is very complex. Therefore, as previously explained, the control variate is expressed as the product of its integral G and its shape $\bar{g}(x)$. The shape always integrates to a value of one, so that no matter what the shape is, multiplying the shape by G equates both sides of the neural light field equation $1 \cdot G = \int_{\mathcal{D}} G\bar{g}(x) dx$. Probability density functions (PDFs) are non-negative normalized functions that integrate to one and may be represented by a normalizing flow controlled by a trained neural network.

Figure 1C:
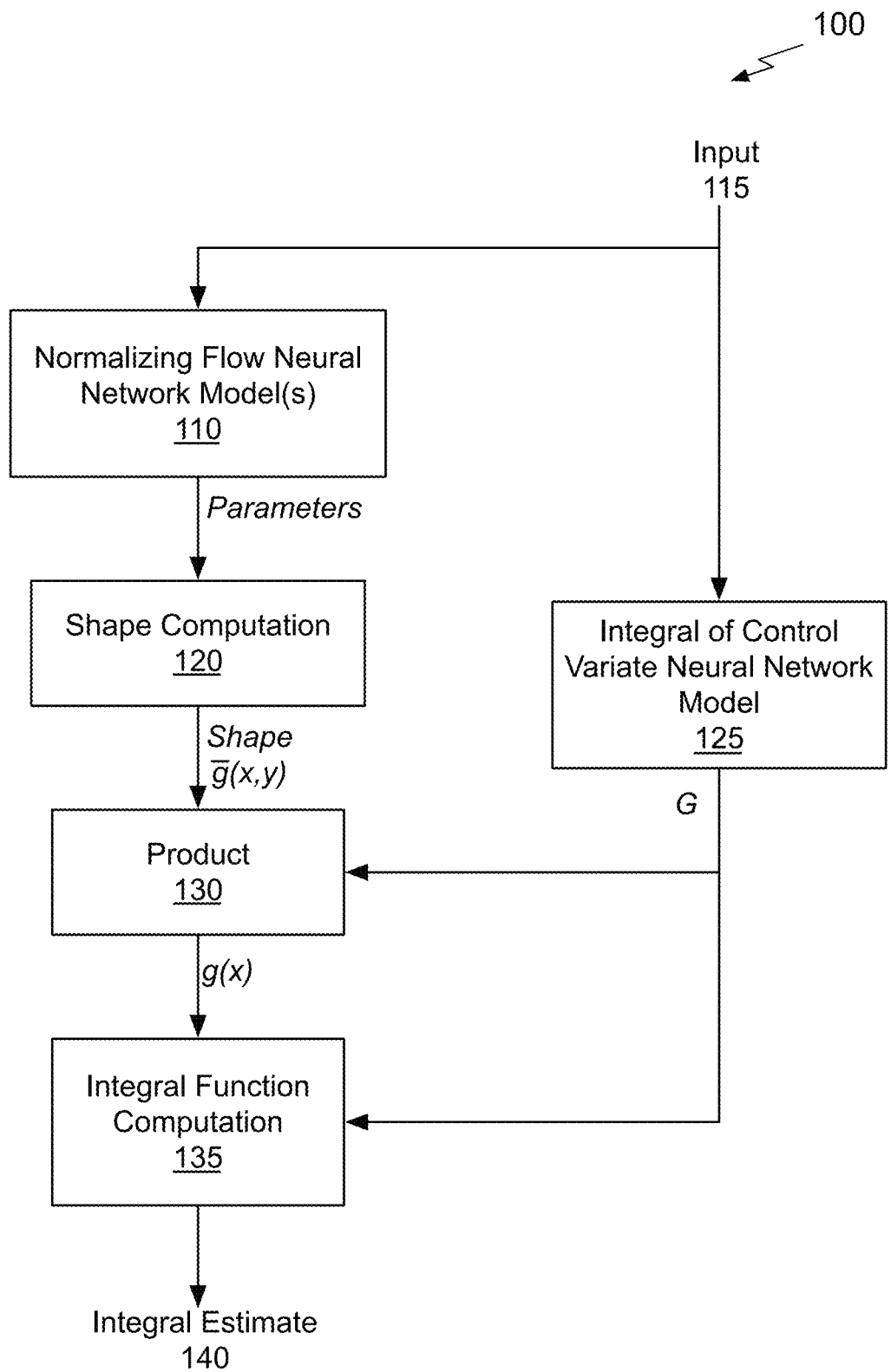
FIG. 1C illustrates a block diagram of a control variate neural network system, in accordance with an embodiment.

FIG. 1C illustrates a block diagram of a control variate neural network system 100, in accordance with an embodiment. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the control variate neural network system 100 is within the scope and spirit of embodiments of the present disclosure.

The control variate neural network system 100 receives an input 115 and generates an integral estimate 140. The control variate neural network system 100 reduces the variance of estimating the parametric integral F through machine learning. In an embodiment, the input 115 is a parameter y. For the light transport example of FIG. 1B, F(y) is the reflected radiance field and the parameter y represents the reflection location and direction.

The relationship between F, the integral estimate 140 and g(x), the control variate (omitting the scaling coefficient α), is: $F(y)=\int f(x,y)dx=\int f(x,y)+g(x,y)-g(x,y)dx$, where $g(x,y)-g(x,y)=0$. Then, $F(y)=\int g(x,y)dx+\int f(x,y)-g(x,y)dx$. The integral of the control variate is $G(y)=\int g(x,y)dx$, producing $$F(y)=G(y)+\int f(x,y)-g(x,y)dx. \quad \text{Eq. (2)}$$

In many applications and especially in computer graphics, the functions F(y) and $f(x,y)$ may have infinite variation and lack smoothness. The models for approximating the functions thus need to be sufficiently flexible and highly expressive. In an embodiment, the control variate is modeled using one or more neural networks driven by an optimizable set of parameters $\theta_g$.

Solving F(y) using Equation (2) requires G(y) and g(x,y). Learning the control variate g(x,y) and computing the integral G(y) from g(x,y) is difficult and/or impractical done in real time (possibly except for very simple models). Separately learning the control variate g(x,y) and the integral G(y) is difficult because the equality between G(y) and the integral of the control variate should be preserved. Therefore, the control variate neural network model 125 learns the integral G(y) and the normalizing flow neural network model(s) 110 learn parameters that are applied to a normalizing function (e.g., PDF) by the shape computation 120 to generate a normalizing flow $\bar{g}(x,y)$.

The normalizing flow is the normalized shape of G(y) and has the property that it integrates to one, so G(y) can be computed as:

$$G(y)=\int g(x,y)dx=\int G(y)\bar{g}(x,y)dx \quad \text{Eq. (3)}$$

A first neural network model, integral of control variate neural network model 125 predicts G(y). G(y) is exactly the integral of g(x,y) and a set of second neural networks comprising normalizing flow neural network model(s) 110 and shape computation 120 predicts the shape $\bar{g}(x,y)$. Product 130 computes the product of G(y) and $\bar{g}(x,y)$ that equals the control variate g(x,y).

The control variate is computed by product 130 as a product of G(y) and the normalizing flow. Equation (2) can be evaluated by an integral function computation 135 using the computed control variate (and the integral G(y)) to estimate a solution of the integral function F(y). Specifically, the integral of the difference between $f(x)$ and g(x,y) is summed with G(y) to produce F(y). In an embodiment, the integral of the control variate and the shape of the control variate are independently learned by the integral of control variate neural network model 125 and the normalizing flow neural network model(s) 110.

In order to use Equations (1) and (2), the integral of control variate neural network model 125 should permit an efficient evaluation of the control variate $g(x,y;\theta_g)$ and its integral $G(y)=\int g(x,y;\theta_g)dx$. This turns out to be the key challenge. Modeling g using a neural network may be sufficiently expressive, but computing the integral G would require some form of numerical integration necessitating multiple forward passes to evaluate $g(x,y;\theta_g)$; a cost that is too high.

Integration requiring multiple passes may be avoided by restricting g to functions where the integral is known. In an embodiment, g is restricted to normalized functions that integrate to one. Arbitrary integrands can still be matched by scaling the normalized function by a (learned) factor. Hence, the parametric control variate $$g(x,y;\theta_g):=\bar{g}(x,y;\theta_{\bar{g}})\cdot G(y;\theta_G) \quad \text{Eq. (3)}$$

is defined as the product of two components: a parametric normalized function $\bar{g}(x,y;\theta_{\bar{g}})$ and a parametric scalar value $G(y;\theta_G)$. In the context of the following description, $\bar{g}$ and G are referred to as the shape and the integral of the control variate, each of which is parameterized by a set of parameters; $\theta_g:=\theta_{\bar{g}}\cup\theta_G$. The decomposition into separate sets of parameters has the advantage that computing the integral G amounts to evaluating the integral of control variate neural network model 125 once, rather than performing a costly numerical integration of $g(x,y;\theta_g)$ that requires a large number of neural network evaluations.

In an embodiment, the integral value $G(y;\theta_G)$ output by the integral of control variate neural network model 125 may be exponentiated, allowing the integral of control variate neural network model 125 to output a high-dynamic range of values while internally operating on numerically better behaved low dynamic range. In an embodiment, a combination of the exponentiated representation that is always positive and the normalizing flow for the control variate shape constrains the control variate to be a non-negative function; negative values are excluded by design.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2A:
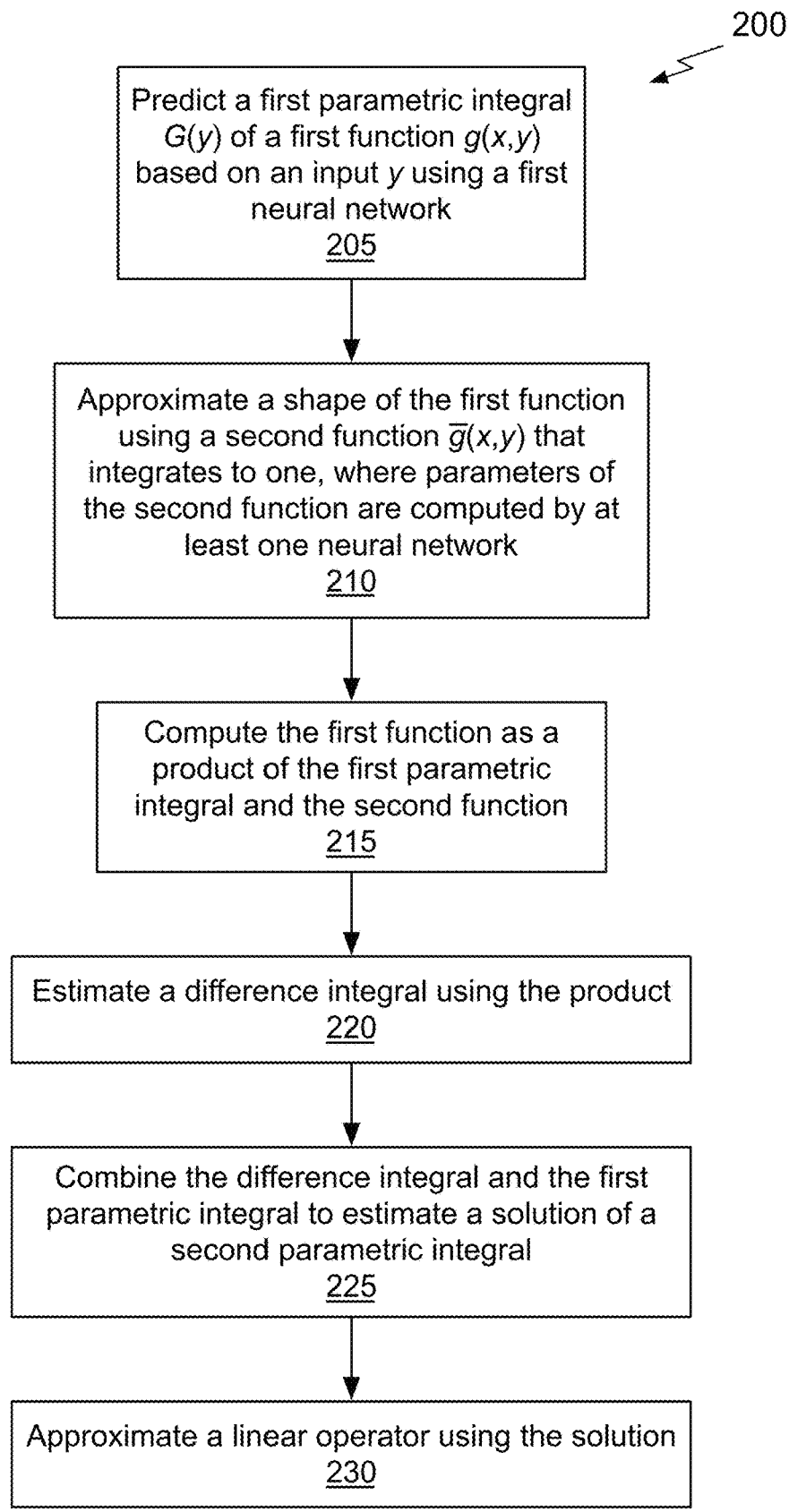
FIG. 2A illustrates a flowchart of a method for generating a control variate using a neural network system suitable for use in implementing some embodiments of the present disclosure.

FIG. 2A illustrates a flowchart of a method 200 for generating a control variate using a neural network system suitable for use in implementing some embodiments of the present disclosure. Each block of method 200, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 200 is described, by way of example, with respect to the control variate neural network system 100 of FIG. 1C. However, this method may additionally or alternatively be executed by any one system, or any combination of systems, including, but not limited to, those described herein. Furthermore, persons of ordinary skill in the art will understand that any system that performs method 200 is within the scope and spirit of embodiments of the present disclosure.

At step 205, a first parametric integral G(y) of a first function g(x,y) is predicted using a first neural network based on an input y. In an embodiment, the first parametric integral is the scaled parametric integral α(y)G(y). In an embodiment, the first neural network is the integral of control variate neural network model 125.

Since the control variate may not match $f$ perfectly, in an embodiment the control variate is weighted by the control variate coefficient α that controls its contribution. As previously described, the optimal, variance-minimizing value of α(y) is known to be Cov(f(x,y),g(x,y))/Var(g(x,y)). However, computing the optimal value, which generally varies with y, can be prohibitively expensive in practice. Therefore, the coefficient may instead be modeled using a coefficient neural network α(y;θ$_α$), that is trained to output the appropriate contribution of the control variate dependent on the parameter y. A loss function for optimizing the coefficient neural network may be used to minimize variance for Monte Carlo estimates or error for quasi-Monte Carlo estimates.

At step 210, a shape of the first function is approximated using a second function $\bar{g}$(x,y) that integrates to one, where parameters of the second function are computed by at least one neural network. In an embodiment, the at least one neural network is the normalizing flow neural network model(s) 110. A normalizing flow is a computational graph that represents a differentiable, multi-dimensional, compound mapping for transforming probability densities. The mapping comprises $\mathcal{L}$ bijective warping functions $\hat{h}=h_L \cdots \cdot h_2 \cdot h_1$; it is therefore also bijective as a whole. The warping functions h: $\mathcal{X} \to \mathcal{X}'$ induce a density change according to the change-of-variables formula $$p_{X'}(x') = p_X(x) \cdot \left|\det\left(\frac{\partial h(x)}{\partial x^T}\right)\right|^{-1}, \quad \text{Eq. (4)}$$

where p is a probability density, x∈ $\mathcal{X}$ is the argument of the warp x'=h(x)∈ $\mathcal{X}'$ is the output of the warp, and $$\left(\frac{\partial h(x)}{\partial x^T}\right)$$

is the Jacobian matrix of h at x.

The density change induced by a chain of L such warps can be obtained by invoking the chain rule. This yields the following product of absolute values of Jacobian determinants:

$$J(x) = \prod_{i=1}^{L} \left|\det\left(\frac{\partial h(x)}{\partial x^T}\right)\right|, \quad \text{Eq. (5)}$$

where $x_1$=x. The i-th term in the product represents the absolute value of the Jacobian determinant of the i-th warp with respect to the output of warp i−1.

The transformed variable $\hat{x}=\hat{h}(x)$ is often referred to as the latent variable in latent space $\mathcal{L}$. Its distribution is related to the distribution of the input variable by combining Equations (4) and (5):

$$p_\mathcal{L}(\hat{x}) = \frac{p_X(x)}{J(x)}. \quad \text{Eq. (6)}$$

The distribution of latent variables $p_\mathcal{L}(\hat{x})$ is typically chosen to be simple and easy to sample. In an embodiment, the uniform distribution $p_\mathcal{L}(\hat{x}) \equiv p_\mathcal{U}(x)$ over the unit hypercube is used.

In order to achieve high modeling power, neural normalizing flows utilize parametric warps that are driven by the output of neural networks. To allow modeling correlations across dimensions, the outputs of individual warps need to be fed into neural networks conditioning the subsequent warps in the flow. In the context of probabilistic modeling, two conventional approaches are autoregressive flows and coupling flows. Both of these approaches yield flows that are (i) invertible, (ii) avoid the cubic cost of computing determinants of dense Jacobian matrices, and (iii) avoid the need to differentiate through the neural network to compute relevant entries in the Jacobian.

To generate the control variate shape $\bar{g}$(x), efficient invertibility of the flow is not needed as modeling the control variate shape requires evaluating the flow in only one direction. However, it is still possible to take advantage of the previously proposed autoregressive formulation to ensure tractable Jacobian determinants. Furthermore, the model, such as the normalizing flow neural network model(s) 110, can be further accelerated in cases when multiple densities—specifically, multiple channels of the control variate—are being learned.

In an embodiment, the unit hypercube with the same dimensionality as g is used as the latent space $\mathcal{L}$. The normalized control variate is then modeled as $$\bar{g}(x):=p_x(x;\theta_{\bar{g}})=p_\mathcal{L}(\hat{x}) \cdot J(x;\theta_{\bar{g}}). \quad \text{Eq. (7)}$$

It is worth noting that the product on the right-hand side is normalized by construction: the probability density $p_\mathcal{L}$ is normalized by definition and each warp in the flow merely redistributes the density without altering the total mass. This is key for ensuring that $\bar{g}$(x) is and remains normalized during training.

In an embodiment, the warps in the normalizing flow assume an autoregressive structure: dimension d in the output $x_{i+1}$ of the i-th warp is conditioned on only the preceding dimensions in the input $x_i$:

$$x_{i+1}^d = h(x_i^d; m(x_i^{<d}; \phi_i^d)), \quad \text{Eq. (8)}$$

where the superscript <d denotes the preceding dimensions and $\phi_i^d$ are network parameters. This ensures tractable Jacobian determinants that are computed as the product of diagonal terms in the Jacobian matrix of h. The diagonal terms are specific to the transform h being used. In an embodiment, an autoregressive structure is used in the normalizing flow and an independent network is used for inferring the warp of each dimension. Having an independent network per dimension simplifies the implementation and, importantly, facilitates network sharing when predicting with multi-channel control variates.

Many integration problems simultaneously operate on multiple, potentially correlated channels, such as RGB (red, green, blue) channels. In order to minimize the variance per channel, it is advantageous to use a separate control variate for each channel rather than sharing one control variate across all channels. A straightforward solution is to instantiate a distinct normalizing flow for each channel. Unfortunately, per-channel flows result in a computation cost that increases linearly as the number of channels increases. In contrast, the cost may be kept largely constant by sharing corresponding neural networks across the channels. However, since network sharing introduces correlations across channels, e.g. red dimensions can influence green dimensions, special care must be taken to constrain the model correctly.

Merely concatenating the inputs to the k-th network across the per-channel flows and instrumenting the neural network to produce parameters for warping dimensions in all n channels is problematic as it corresponds to predicting a single normalized (n×D)-dimensional function. Instead, n individually normalized, D-dimensional functions may be implemented, as in the case of instantiating a distinct flow for each channel to ensure that each channel of the control variate is normalized individually.

Note that since channels can influence each other only after the first sub-flow, the first sub-flow produces individually normalized functions, even if the networks are shared across the channels. This is easy to verify by inspecting the nD×nD Jacobian matrix constructed for all dimensions in all channels. The matrix will have a block-diagonal structure, where each d×d block corresponds to the Jacobian matrix of one of the channels. All entries outside of the blocks on the diagonal will be zero. This observation allows sharing of the networks as long as only one sub-flow is used to model each channel of the control variate shape. The multi-channel normalizing flow represents the spectrally resolved per-channel normalized form $\bar{g}$ of the control variate g.

Returning back to FIG. 2A, where, at step 215, the first function g(x,y) is computed as a product of the first parametric integral G(y) and the second function $\bar{g}$(x,y). In an embodiment, the first function is computed by the product 130. In an embodiment, the first parametric integral is scaled by the parametric scaling coefficient α(y).

At step 220, a difference integral $\int f(x,y)-g(x,y)dx$ is estimated using the product. The difference integral or the integral of the difference between $f(x)$ and the control variate g(x), is the error. For example, as previously described in conjunction with FIG. 1B, the error 155 is summed with G (e.g., neural light field 160) to produce F (e.g., reference light field 150). In an embodiment, a heuristic is used to select a subset of inputs for which the difference integral is set to zero. In other words, for the subset of inputs, the difference integral is not calculated. In an embodiment, the heuristic compares a selected threshold to at least one of the exact or an approximate area of the path differential of the light transport path at the vertex associated with the input. In an embodiment, parameters or weights of the first neural network and the at least one neural network are determined by minimizing variance of estimates of the difference integral using a Monte Carlo algorithm.

At step 225, the difference integral and the first parametric integral are combined to estimate a solution of a second parametric integral F (y)=G (y)+$\int f(x,y)-g(x,y)dx$. In an embodiment, both the product and the first parametric integral are scaled by a parametric scaling coefficient α(y). In an embodiment, the parametric scaling coefficient is computed by a second neural network and the weights of the second neural network are obtained by minimizing a variance of estimating the difference integral using a Monte Carlo algorithm. In an embodiment, the parametric scaling coefficient minimizes a variance of estimating the difference integral using a Monte Carlo algorithm.

In an embodiment, importance sampling of x that is proportional to the absolute difference $|f(x,y)-g(x,y)|$ is used to estimate the difference integral. In an embodiment, a combination of one or more PDFs is selected for use as a sampling distribution. The PDFs may be combined according to learned probabilities. For example, to probabilistically select between uniform sampling $p_u$ and neural importance sampling $p_{NI}$, a parametric probability selection neural network $c(x;\theta_c)$ may be trained to approximate the variance-optimal selection probabilities of $p_{NI}$. In an embodiment, $c(x;\theta_c)$ is optimized concurrently with the control variate and PDF models to achieve a balance between uniform and neural importance sampling at any point during the training process. The final PDF may be:

$$p(x;\theta_p)=(1-c(x;\theta_c))\,p u(x)+c(x;\theta_c)p_{NI}(x;\theta_{N1}),\text{ where}$$
$$\theta_P:=\theta_c\cup\theta_{NI}.$$

In an embodiment, importance sampling is performed using a normalizing flow that is parameterized by the at least one neural network, such as the normalizing flow neural network models(s) 110. In an embodiment, weights of the first neural network and the at least one neural network are determined by minimizing a relative $L_2$ error between G(y) and F(y), minimizing a Kullback-Leibler (KL) divergence between $\bar{g}$(x,y) and $f(x,y)/\int f(x,y)dx$, and minimizing a KL divergence between $|f(x,y)-g(x,y)|/\int|f(x,y)-g(x,y)|dx$ and an importance sampling distribution.

At step 230, a linear operator is approximated using the solution. In an embodiment, the linear operator generates an image; and the image represents a 3D scene rendered from a viewpoint. To generate the image, the neural network system 100 receives vertices of segments of light transport paths traced from a viewpoint into the 3D scene, where at least one of the first neural network and the at least one neural network predicts values at the vertices of the light transport paths.

In an embodiment, the second parametric integral F(y) represents a value of at least one of a light field, radiance, intensity, radiosity, irradiance, fluence, spectral radiance, field radiance, and volumetric radiance for a specific input (y). In an embodiment, the input y to the first neural network is hit information associated with a vertex of a light transport path.

In an embodiment, the first neural network and the at least one neural network are trained using light transport paths. In an embodiment, the first neural network is trained using at least a first value of the input including the first value and at least one second value of the input. In an embodiment, this may be implemented using a Q-learning reinforcement technique, such as described in K. Dahm and A. Keller. 2017. Learning Light Transport the Reinforced Way. CoRR abs/1701.07403 (2017). http://arxiv.org/abs/1701.07403.

The technique of predicting the neural control variate to estimate a linear operator, such as an integral, may be applied to Monte Carlo and quasi-Monte Carlo integration. The technique for computing control variates may also be used for Bayesian statistics, nuclear physics (Feynman integrals and particle transport), reinforcement learning, light-transport simulation, medical simulations, 5G/6G communication technology, solving any high-dimensional integral. The technique may be used with neural importance sampling.

When applied to light transport simulation, neural control variates are capable of matching the state-of-the-art performance of other unbiased approaches, while providing means to develop more performant, practical solutions. Physically-based image synthesis relies on estimating the scattered radiance $$L_s(x,\omega)=\int_{S^2}f_s(x,\omega,\omega_i)L_i(x,\omega_i)|\cos\gamma|d\omega_i$$

that leaves surface point x in direction $\omega$, where $f_s$ is the bidirectional scattering distribution function (BSDF), $L_i$ is radiance arriving at x from direction $\omega_i$, and $\gamma$ is the foreshortening angle.

The scattered radiance $L_s(x,\omega)$ corresponds to the parametric integral $F(y)$, where $y \equiv (x,\omega)$, which is referred to as the query location. The integration domain and the integration variable are the unit sphere and the direction of incidence, i.e., $\mathcal{D} \equiv S^2$ and $x \equiv \omega_i$, respectively, referring to equations (1) and (2). The goal is to reduce estimation variance by leveraging the parametric control variate. The integral component serves as an approximation of the scattered radiance, i.e., $G(x,\omega;\theta_G) \approx L_s(x,\omega)$ while the shape component $\bar{g}(x,\omega,\omega_i;\theta_{\bar{g}})$ approximates the normalized integrand.

The learned light-field approximation is of sufficient quality for higher-order bounces, so that, in an embodiment, the error correction may be omitted and thereby dramatically reduce the noise at the cost of insignificant visible bias. Using the example of light transport, error is the difference integral and, as previously described, the error is summed with G (e.g., predicted light field) to produce F (e.g., true light field). The error is the integral of the difference between $f(x)$ and the control variate $g(x)$.

Neural control variates may be employed on light-transport simulations governed by Fredholm integral equations of the second kind. Such integral equations are notoriously difficult to solve efficiently due to their recursive nature, often necessitating high-dimensional samples in the form of multi-vertex transport paths obtained using, e.g., path tracing. Control variates offer two compelling advantages over conventional techniques that only focus on placing the samples. First, control variates reduce the number of constructed path vertices as the difference integral typically carries less energy than the original integral. Paths can thus be terminated earlier using the learned scattered radiance as an approximation of the true scattered radiance. A heuristic may be used to minimize the resulting bias. Second, control variates trivially support spectrally resolved path tracing by using a different g for each spectral band (e.g., color channel). As previously described, to avoid computational overhead of using potentially many control variates, a normalizing flow that can represent multiple (ideally correlated) control variates at once may be implemented. Spectral noise, which is typical for importance sampling that only targets scalar distributions, is thus largely suppressed.

Figure 2B:
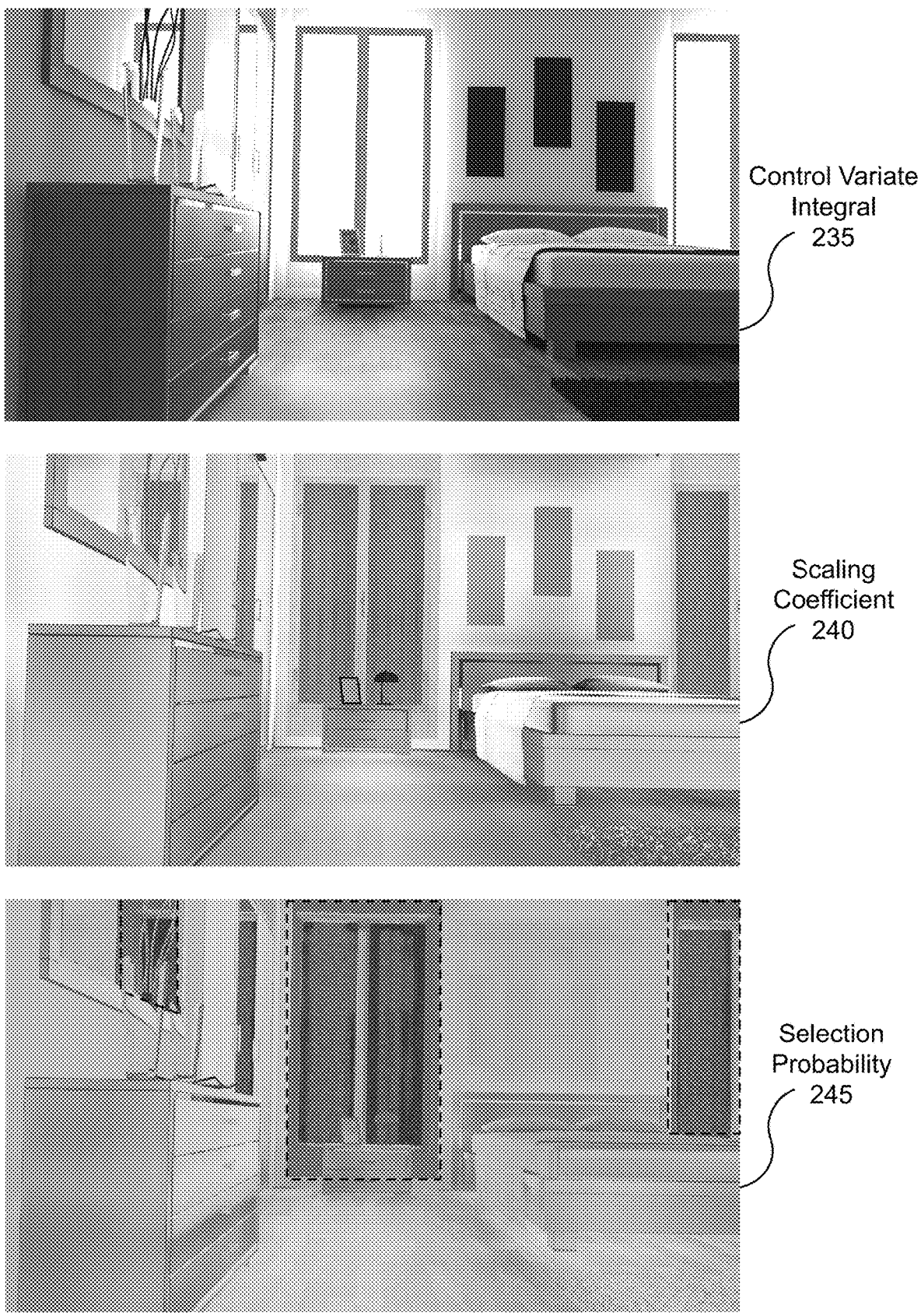
FIG. 2B illustrates images of a control variate integral G and a coefficient $\alpha$ predicted by the control variate neural network system, and selection probability, in accordance with an embodiment.

FIG. 2B illustrates images of a control variate integral G 235 and scaling coefficient $\alpha$ 240 predicted by the control variate neural network system 100, and selection probability 245, in accordance with an embodiment. The selection probability may be predicted by the probability selection neural network $c(x;\theta_c)$. The images shown in FIG. 2B provide a visualization of the contribution for each component of the trainable control variate for the light-transport integral equation at the primary vertices (first non-delta interaction) of each pixel. The control variate integral approximates the scattered light field $L_s(x,\omega)$ remarkably well. In places where either the control variate integral or the shape is inaccurate, the learned a scaling coefficient weighs down the contribution of the control variate to the unbiased estimator. Lastly, the learned selection probability blends between bidirectional scattering directional function (BSDF) sampling and residual neural importance sampling (NIS) such that variance is minimized. As shown in FIG. 2B, glossy surfaces (e.g., windows and mirrors) within dashed boundary areas of the selection probability 245 tend to favor BSDF sampling whereas rougher surfaces often favor residual NIS.

Figure 3A:
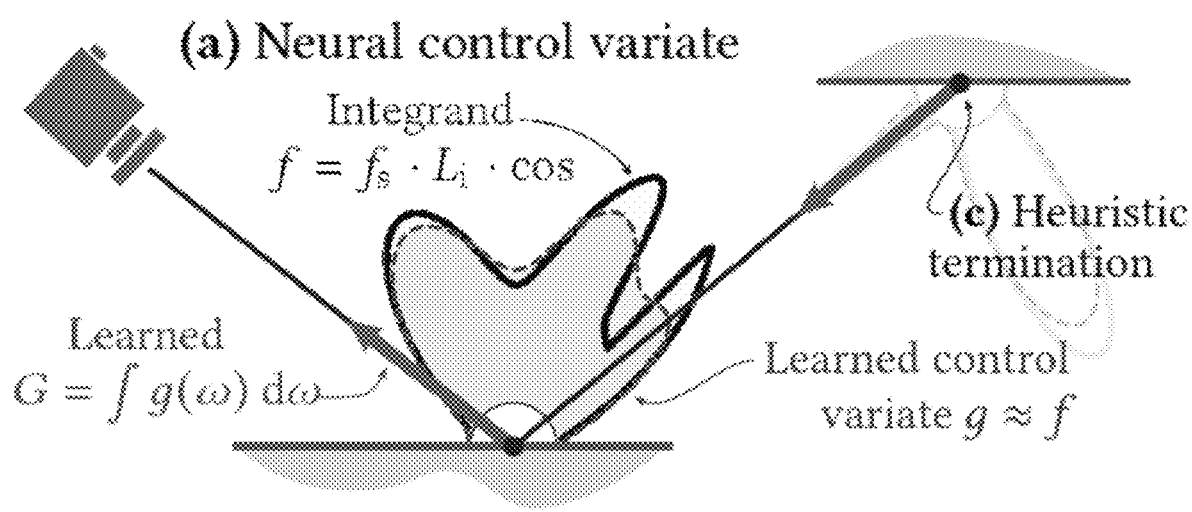
FIG. 3A is a conceptual diagram illustrating the use of the neural control variate for light transport simulation, in accordance with an embodiment.

FIG. 3A is a conceptual diagram illustrating the use of the neural control variate for light transport simulation, in accordance with an embodiment. When applied to light transport simulation, the neural control variate algorithm learns an approximation G of the scattered light field and corrects the approximation error by estimating the difference between the original integrand $f$ and the corresponding learned control variate g. The neural control variate algorithm couples g and G such that g always exactly integrates to G. To further reduce noise, importance sampling may be applied to the absolute difference integral using a learned PDF p. A heuristic may be provided to terminate paths early by using the approximation G. Early termination of paths reduces the mean path length and removes most of the remaining noise. In an embodiment, given an equal amount of time, the unbiased technique of using neural importance sampling with the neural control variate has 29% lower mean absolute percentage error (MAPE), whereas the biased algorithm (with early path termination heuristic) reduces MAPE by an additional 40%. This error reduction roughly amounts to 10× greater efficiency.

When used for light transport, in an embodiment, the first neural network learns the amount of light reflected from the first surface intersection to trace fewer paths. When only the first segment of a path needs to be traced, the technique is very efficient. In other embodiments, the first neural network learns the amount of light reflected on later bounces. For example, if the first vertex is a perfect mirror, then the control variate is computed for the next intersection along the path. In an embodiment, importance sampling is used at a first segment corresponding to the vertex to determine a direction of a subsequent segment of the light transport path.

In an embodiment, the first neural network is trained to learn the light field of the 3D scene using noisy light paths (e.g., not 2D images). The trained first neural network can then predict the value of the light field toward the camera based on hit information (e.g., 3D position, view direction, surface normal, etc.) for the primary rays (i.e., first segments) or for later rays.

The recursive estimation of radiance terminates when the path escapes the scene or hits a black-body radiator that does not scatter light. Since the integral component of the control variate approximates the scattered light field well in many cases, the path may sometimes be truncated early, producing a biased radiance estimate. In particular, the neural scattered light field G may be terminated early at non-specular surfaces. However, terminating too early may produce an image with errors manifesting as low-frequency variations and blurriness. A criterion may be used for ignoring the correction term, i.e., approximating L s by the neural light field G.

In an embodiment, the criterion measures the stochastic area-spread of path vertices. Once the area spread becomes sufficiently large, the path may be terminated and the neural light field G may be used instead.

Figure 3B:
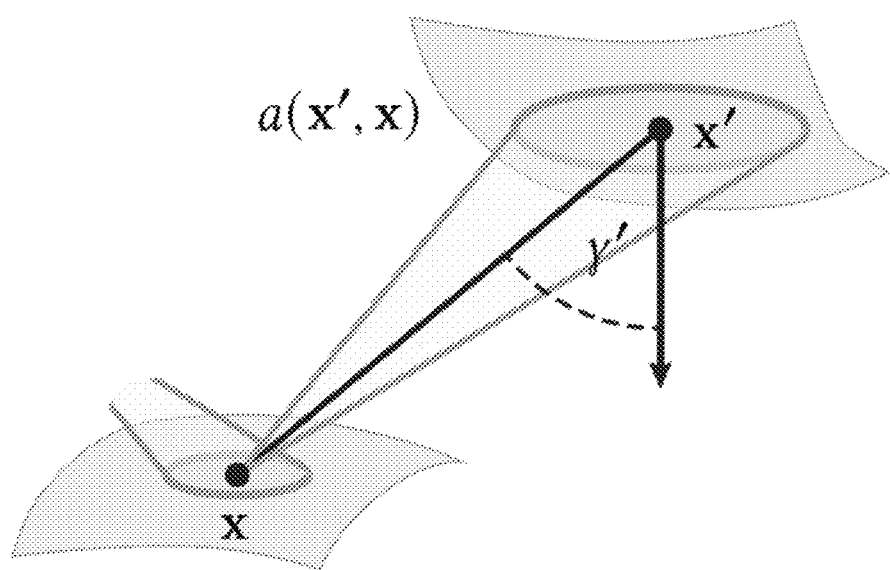
FIG. 3B illustrates a path vertex and a corresponding induced area spread, in accordance with an embodiment.

FIG. 3B illustrates a path vertex x and a corresponding induced area spread, in accordance with an embodiment. A direction $\omega$ is sampled using $p(\Omega|x,\omega)$ at path vertex x, inducing an area spread of $$a(x', x) = \frac{1}{p(x'|x, \omega)} = \frac{\|x - x'\|^2}{p(\Omega|x, \omega)|\cos\gamma'|}$$

around the next path vertex x', where y' is the angle of incidence at x'. The cumulative area spread at the n-th path vertex is the convolution of the spreads induced at all previous vertices. Assuming isotropic Gaussian spreads with variance $\sqrt{\alpha(x',x)}$ and parallel surfaces, the convolution can be approximated by summing the square root of the area spreads at consecutive vertices and re-squaring:

$$a(x_1, \ldots, x_n) = \left(\sum_{i=2}^{n} \sqrt{a(x_i, x_{i-1})}\right)^2$$

The cumulative area spread is compared to the pixel footprint projected onto the primary vertex $x_1$. In an embodiment, if the projected pixel footprint is more than 10,000× smaller than the path's cumulative area spread—loosely corresponding to a 100-pixel-wide image-space filter, the path is terminated into $G(x,\omega_i)$. Otherwise, the unbiased control variates are applied to recursively evaluate the heuristic at the next path vertex. In other embodiment, different sizes or threshold values of a projected pixel footprint area are used to control termination. The heuristic path termination shortens the mean path length and removes a significant amount of noise at the cost of a small amount of visible bias.

Figure 3C:
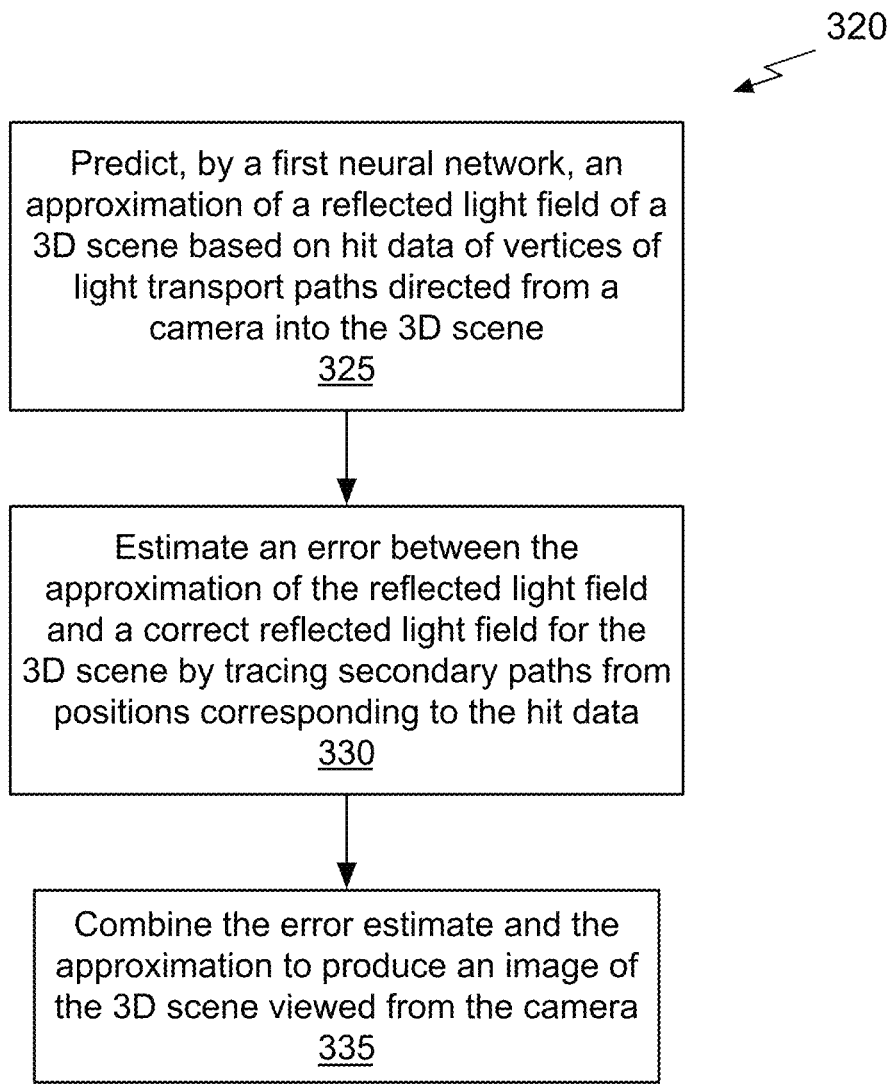
FIG. 3C illustrates a flowchart of a method for producing an image of a 3D scene, in accordance with an embodiment.

FIG. 3C illustrates a flowchart of a method 320 for producing an image of a 3D scene, in accordance with an embodiment. Each block of method 320, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 320 is described, by way of example, with respect to the control variate neural network system 100 of FIG. 1C. However, this method may additionally or alternatively be executed by any one system, or any combination of systems, including, but not limited to, those described herein. Furthermore, persons of ordinary skill in the art will understand that any system that performs method 320 is within the scope and spirit of embodiments of the present disclosure.

At step 325, a first neural network predicts an approximation of a reflected light field of a 3D scene based on hit data of vertices of light transport paths directed from a camera into the 3D scene. In an embodiment, the integral of control variate neural network model 125 predicts G (e.g., predicted neural light field 160 of FIG. 1B). In an embodiment, the approximation of the reflected light field is scaled by alpha ($\alpha$) that is computed by at least one of the first neural network and a second neural network.

At step 330, an error between the approximation of the reflected light field and a correct reflected light field for the 3D scene is estimated by tracing secondary paths from positions corresponding to the hit data to produce an error estimate. In an example, as shown in FIG. 1B, the error 155 is the integral of the difference between the integrand $f(x)$ and the control variate $g(x)$, where $g(x)$ may be scaled by $\alpha$. The approximated reflected light field is independent of the camera location (e.g., position and orientation) and can therefore be used to produce images of the 3D scene from different camera locations. In an embodiment, importance sampling that is proportional to the error estimate is used to select directions in which the secondary paths are traced.

In an embodiment, the importance sampling is performed using a normalizing flow that is parameterized by at least one neural network. For example, the normalizing flow may be performed by the normalizing flow neural network model(s) 110 shown in FIG. 1C. At step 335, the error estimate and the approximation are combined to produce an image of the 3D scene viewed from the camera.

The control variate neural network system 100 may be optimized during rendering in a reinforcement-learning fashion: the vertices of traced paths are used to optimize the neural networks while simultaneously driving variance reduction. The neural networks thus drive variance reduction of their own training data and that of the final image.

Similar to Monte Carlo and quasi-Monte Carlo methods for high-dimensional integration, neural networks are especially helpful in high-dimensional approximation. In contrast with conventional techniques, errors or occasional deviations from the ground-truth solution observable as. patchiness, loss of contrast, or dull highlights are corrected using control variates. Specifically, an estimate of the difference between the correct solution is added to the approximation to recover unbiased results with error manifesting merely as noise. When the control variate is designed well, the residual integral $\int_D f(x) - \alpha \cdot g(x) dx$ typically carries less energy than the original integral $\int_D f(x) dx$. Neural importance sampling is capable of importance sampling arbitrary integrands, including the residual integrals. The control variate neural network system 100 may employ multiple sampling techniques to feature the strengths of each approach as long as all trainable parameters are optimized jointly.

The neural control variates may be used to reduce variance in parametric Monte Carlo integration and to reduce error in parametric quasi-Monte Carlo integration. The control variate neural network system 100 has sufficient approximation power and is efficient to evaluate. The efficiency results from the use of a first neural network that infers the integral of the control variate and using normalizing flows to model the shape of the control variate. The scaling coefficient may be learned and used to reduce noise. Neural importance sampling may be used to estimate the correction term and further reduce the integration error. The parametric trainable control variates can be used with trainable importance samplers, such as neural importance sampling, yielding better results than each technique in isolation. The unbiased application of neural control variates provides an efficiency boost compared with conventional techniques and a biased algorithm improves efficiency significantly. Neural control variates allow for the combination of data-driven, high-quality neural approximation with an accurate, physically-based integrator, which can be used on demand to correct the errors.

Parallel Processing Architecture

Figure 4:
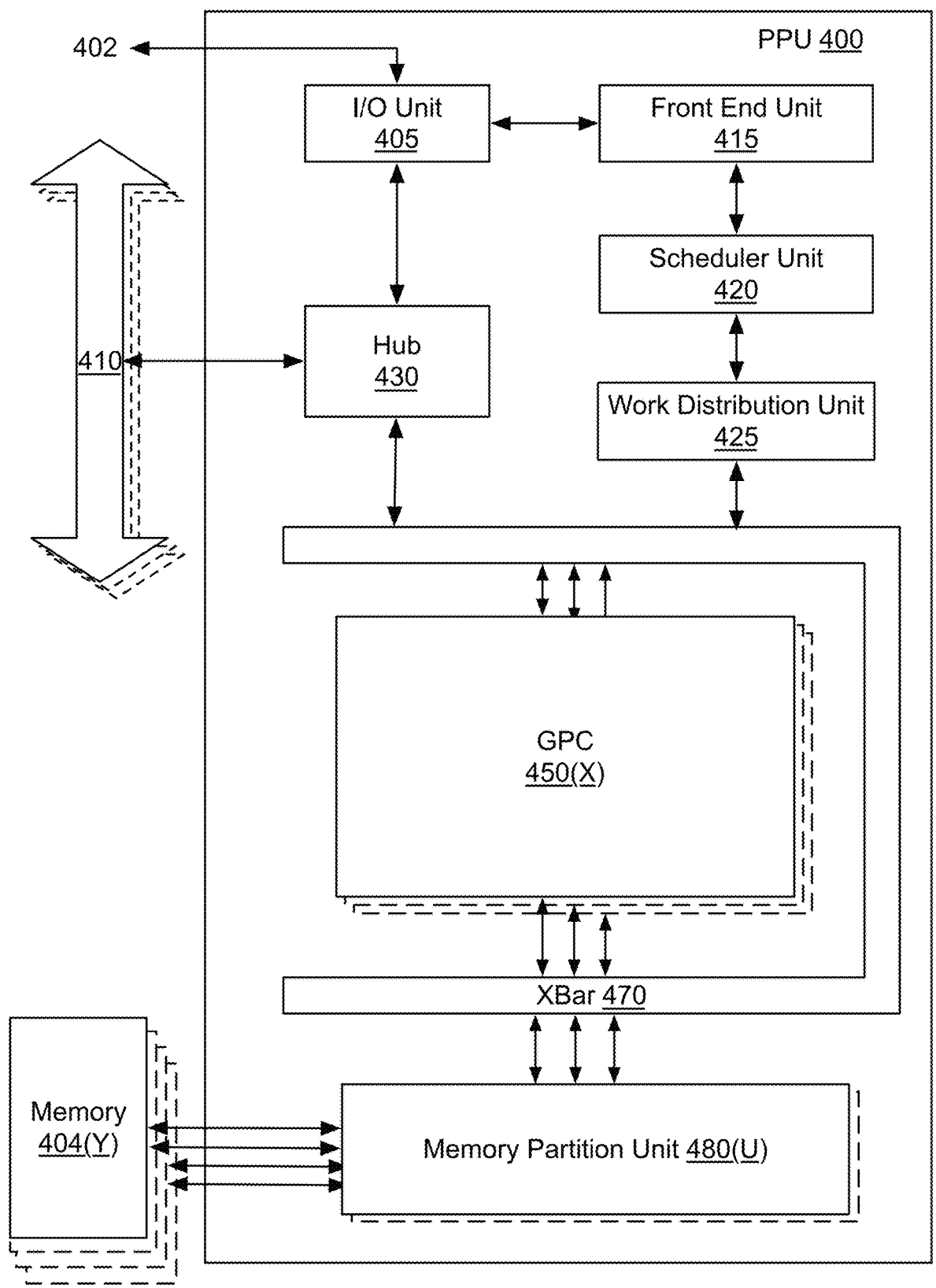
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the control variate neural network system 100.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mipmaps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Ray Tracing (RT) Cores, Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
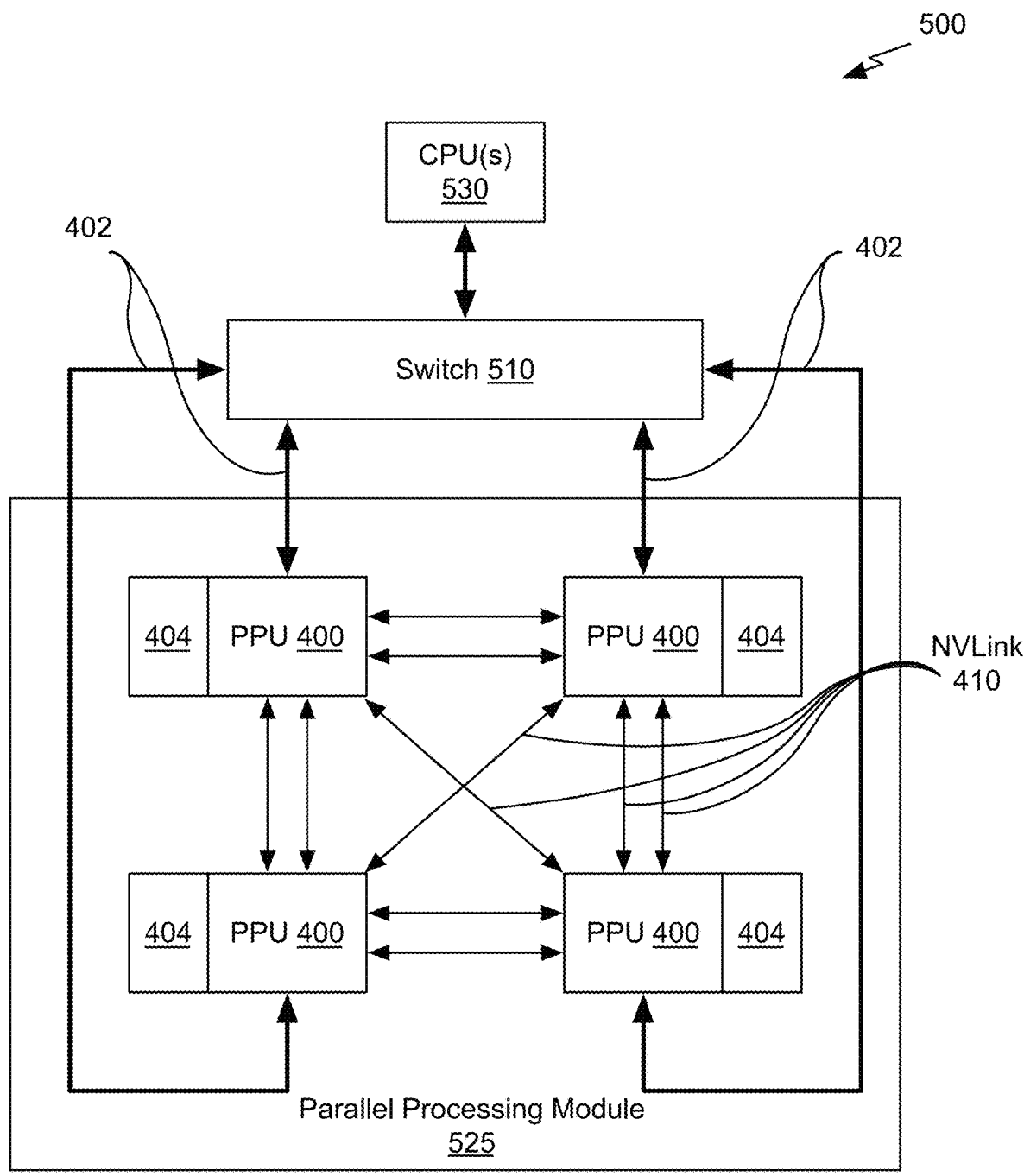
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the method 200 shown in FIG. 2A. The processing system 500 includes a CPU 530, switch 510, and multiple PPUs 400, and respective memories 404.

Figure 5B:
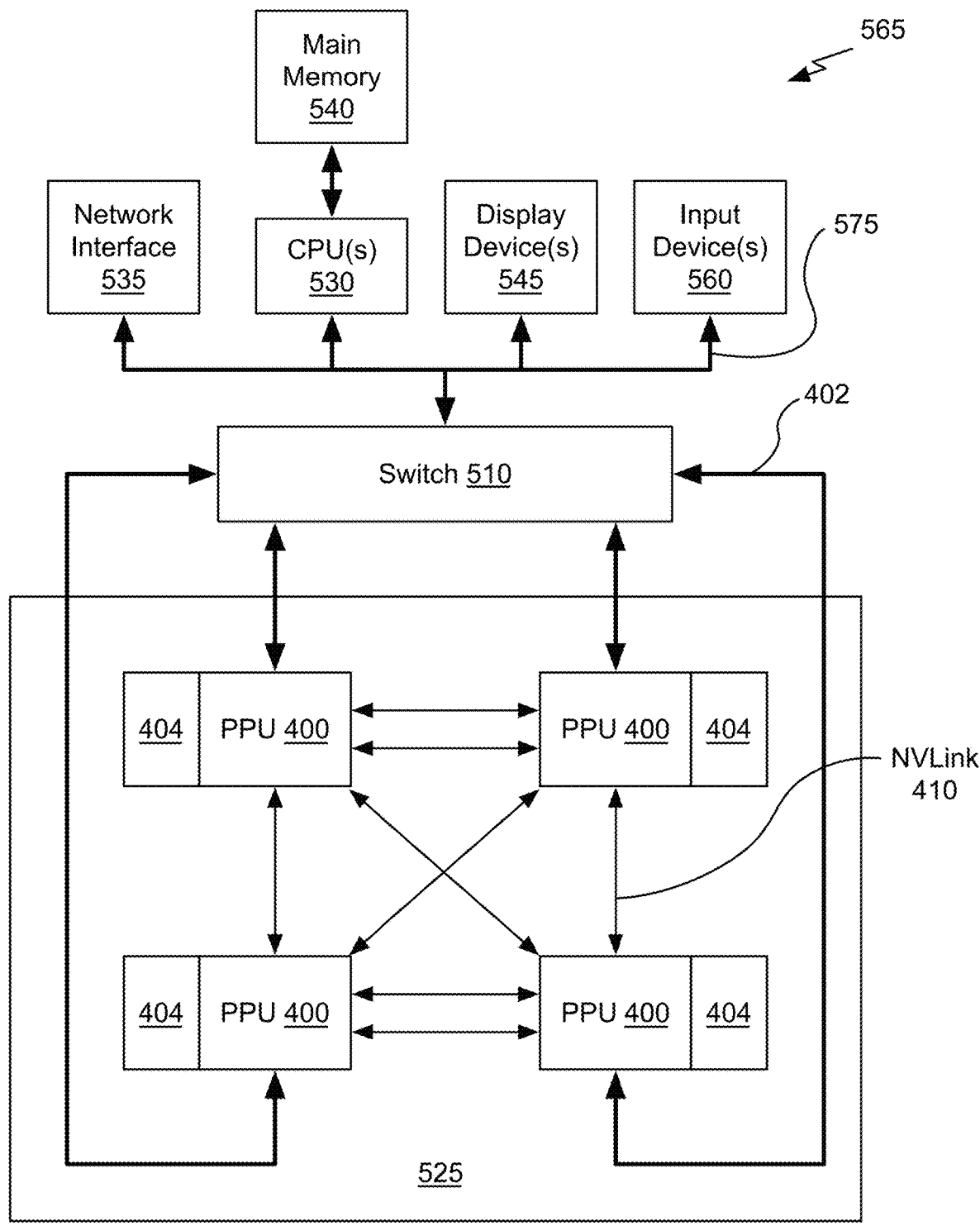
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 200 shown in FIG. 2A.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525.

Where there is direct, or point-to-point connection between components, the communication bus 575 may include a PCIe link to carry out the connection. In these examples, a PCI bus need not be included in the system 565.

Figure 5C:
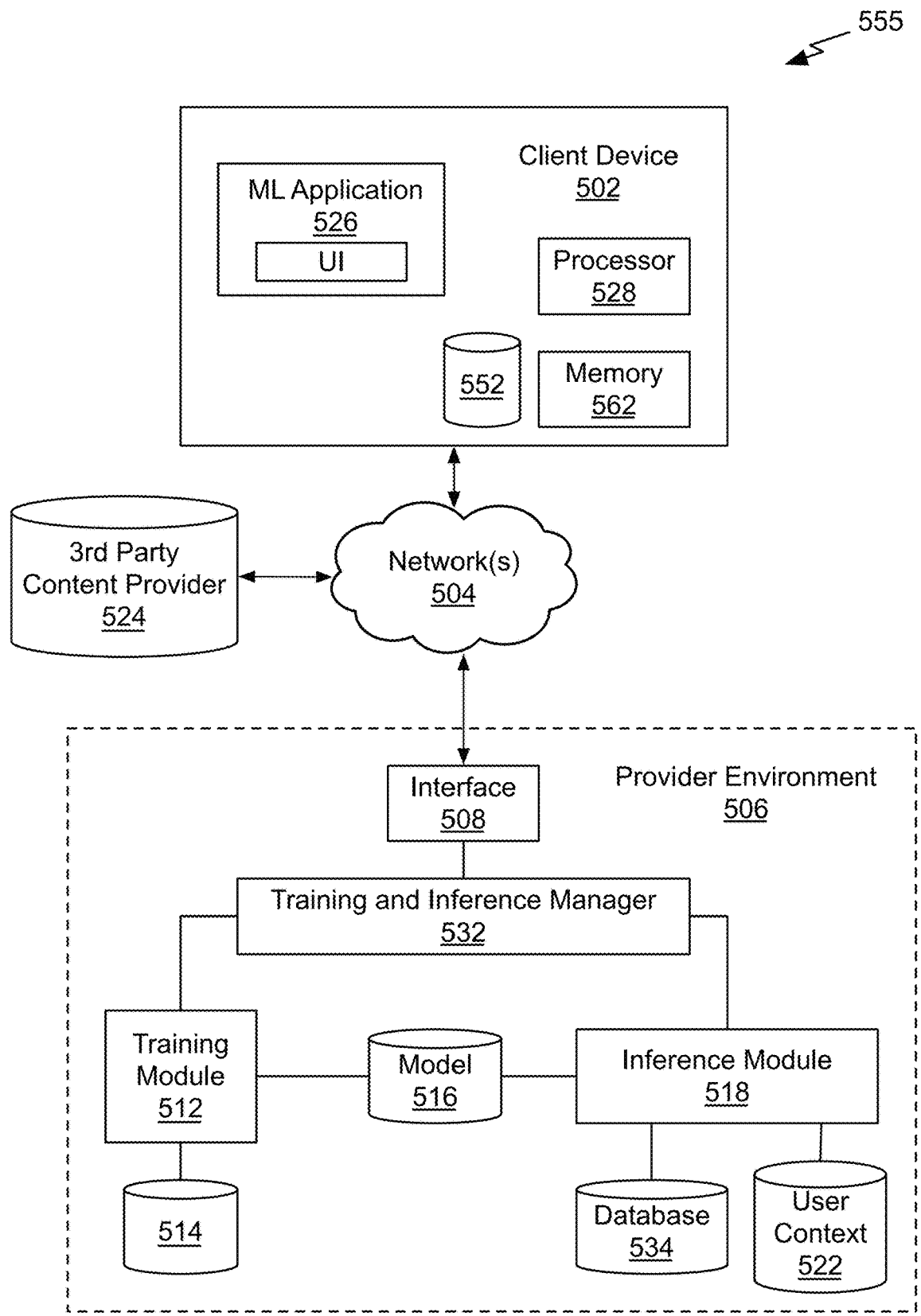
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used to train one or more neural networks within the control variate neural network system 100.

In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A system, comprising:
a processor configured to:
implement a first neural network that is configured to predict an approximation of a reflected light field of a three-dimensional (3D) scene based on hit data of vertices of light transport paths directed from a camera into the 3D scene, wherein the approximation of the reflected light field is independent of a location of the camera;
scaling the approximation of the reflected light field by a learned parametric scaling coefficient that is computed by at least one of the first neural network and a second neural network trained to minimize a variance of estimating a difference integral between the approximation of the reflected light field and a correct reflected light field for the 3D scene;
trace secondary paths from positions corresponding to the hit data to produce an error estimate;

combine the error estimate and the approximation to produce a correct reflected light field for the 3D scene; and synthesize an image of the 3D scene viewed from the camera using the correct reflected light field.

2. The system of claim 1, wherein weights of at least one of the first neural network and the second neural network that is trained to minimize the variance are obtained using a Monte Carlo algorithm.

3. The system of claim 1, wherein importance sampling that is proportional to the error estimate is used to select directions in which the secondary paths are traced.

4. The system of claim 3, wherein the importance sampling is performed using a normalizing flow that is parameterized by at least one additional neural network.

5. The system of claim 1, wherein the processor is further configured to select between uniform sampling and importance sampling to select directions in which the secondary paths are traced.

6. The system of claim 5, wherein a second neural network approximates selection probabilities for the importance sampling.

7. The system of claim 1, wherein the first neural network is trained to learn the approximation of the reflected light field of the 3D scene using light transport paths directed from the camera into the 3D scene and without using two-dimensional images.

8. The system of claim 7, wherein the light transport paths are noisy light transport paths.

9. The system of claim 1, wherein the processor is further configured to use a heuristic to select a subset of inputs to the first neural network for which the error is set to zero.

10. The system of claim 1, wherein the first neural network is trained using at least a first value of the hit data and at least one second value of the hit data.

11. The system of claim 1, wherein the processor is included in a cloud computing environment.

12. The system of claim 1, wherein the processor is included in included in a server or in a data center and the image is streamed to a user device.

13. The system of claim 1, wherein the image is used for training, testing, or certifying a neural network employed in a machine, robot, or autonomous vehicle.

14. The system of claim 1, wherein the processor comprises a graphics processing unit.

15. A non-transitory computer-readable media storing computer instructions that, when executed by one or more processors, cause the one or more processors to perform the steps of:

predicting, by a first neural network, an approximation of a reflected light field of a three-dimensional (3D) scene based on hit data of vertices of light transport paths directed from a camera into the 3D scene, wherein the approximation of the reflected light field is independent of a location of the camera;

scaling the approximation of the reflected light field by a learned parametric scaling coefficient that is computed by at least one of the first neural network and a second neural network trained to minimize a variance of estimating a difference integral between the approximation of the reflected light field and a correct reflected light field for the 3D scene;

tracing secondary paths from positions corresponding to the hit data to produce an error estimate;

combining the error estimate and the approximation to produce a correct reflected light field for the 3D scene; and synthesizing an image of the 3D scene viewed from the camera using the correct reflected light field.

16. The non-transitory computer-readable media of claim 15, wherein weights of at least one of the first neural network and the second neural network that is trained to minimize the variance are obtained using a Monte Carlo algorithm.

17. The non-transitory computer-readable media of claim 15, wherein importance sampling that is proportional to the error estimate is used to select directions in which the secondary paths are traced.

18. The non-transitory computer-readable media of claim 17, wherein the importance sampling is performed using a normalizing flow that is parameterized by at least one additional neural network.

19. The non-transitory computer-readable media of claim 15, further comprising selecting between uniform sampling and importance sampling to select directions in which the secondary paths are traced.

20. The system of claim 1, wherein the integral of differences is computed by integrating the differences between a function integrand and a control variate.

* * * * *